US012568272B2

(12) United States Patent
Sun et al.

(10) Patent No.: US 12,568,272 B2
(45) Date of Patent: Mar. 3, 2026

(54) VIDEO STUTTER PREDICTION METHOD AND APPARATUS, DEVICE AND MEDIUM

(71) Applicant: BEIJING BYTEDANCE NETWORK TECHNOLOGY CO., LTD., Beijing (CN)

(72) Inventors: Liyang Sun, Los Angeles, CA (US); Yanyuan Qin, Los Angeles, CA (US); Qian Ma, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/722,520

(22) PCT Filed: Nov. 4, 2022

(86) PCT No.: PCT/CN2022/129721
§ 371 (c)(1),
(2) Date: Jun. 20, 2024

(87) PCT Pub. No.: WO2023/116233
PCT Pub. Date: Jun. 29, 2023

(65) Prior Publication Data
US 2025/0159285 A1 May 15, 2025

(30) Foreign Application Priority Data
Dec. 20, 2021 (CN) .......................... 202111564883.5

(51) Int. Cl.
*H04N 21/442* (2011.01)
*H04N 21/4402* (2011.01)

(52) U.S. Cl.
CPC .................. *H04N 21/44209* (2013.01); *H04N 21/440245* (2013.01)

(58) Field of Classification Search
CPC ..... H04N 21/44209; H04N 21/440245; H04N 21/2402; H04N 21/442; H04N 21/24
See application file for complete search history.

(56) References Cited

U.S. PATENT DOCUMENTS

2017/0126833 A1* 5/2017 DeLuca ................ H04W 4/029
2017/0171278 A1 6/2017 Yang et al.
(Continued)

FOREIGN PATENT DOCUMENTS

CN 108900856 A 11/2018
CN 109982118 A 7/2019
(Continued)

OTHER PUBLICATIONS

English translation of CN 113055745 A—Jun. 29, 2021 (Year: 2021).*
(Continued)

*Primary Examiner* — Gigi L Dubasky
(74) *Attorney, Agent, or Firm* — BakerHostetler

(57) ABSTRACT

A video stutter prediction method and apparatus, device and medium are provided. The video stutter prediction method includes: acquiring current playing information when a currently downloaded video is played; acquiring current service information of a server; and according to a pre-set stutter prediction model, the current playing information and the current service information, determining a stutter prediction result when a video to be downloaded at present is played.

20 Claims, 4 Drawing Sheets

(56)           References Cited

U.S. PATENT DOCUMENTS

2019/0238856 A1* 8/2019 Dasari ..................... G06T 7/00
2021/0051350 A1* 2/2021 Zhou ................. H04N 21/2393
2024/0121460 A1* 4/2024 Yan ..................... H04N 21/239

FOREIGN PATENT DOCUMENTS

| CN | 110225417 | A |   | 9/2019 |
|----|-----------|---|---|--------|
| CN | 110958491 | A |   | 4/2020 |
| CN | 111031403 | A |   | 4/2020 |
| CN | 111263225 | A |   | 6/2020 |
| CN | 111405327 | A |   | 7/2020 |
| CN | 112584417 | A |   | 3/2021 |
| CN | 112788360 | A |   | 5/2021 |
| CN | 112887795 | A |   | 6/2021 |
| CN | 112995712 | A |   | 6/2021 |
| CN | 113055745 | A | * | 6/2021 |
| CN | 113115074 | A |   | 7/2021 |
| CN | 113453076 | A |   | 9/2021 |
| CN | 113784216 | A |   | 12/2021 |
| CN | 114401447 | A |   | 4/2022 |
| CN | 114401447 | B |   | 8/2024 |
| WO | WO 2017/166492 | A1 | | 10/2017 |
| WO | WO 2021/088174 | A1 | | 5/2021 |
| WO | WO 2021/159609 | A1 | | 8/2021 |
| WO | WO 2021/190090 | A1 | | 9/2021 |

OTHER PUBLICATIONS

China Patent Application No. 202111564883.5; Notice of Grant; dated Jul. 31, 2024; 6 pages.
International Patent Application No. PCT/CN2022/129721; Int'l Written Opinion and Search Report; dated Jan. 28, 2023; 7 pages.
China Patent Application No. 202111564883.5; Office Action; dated Jan. 10, 2024; 17 pages.

* cited by examiner

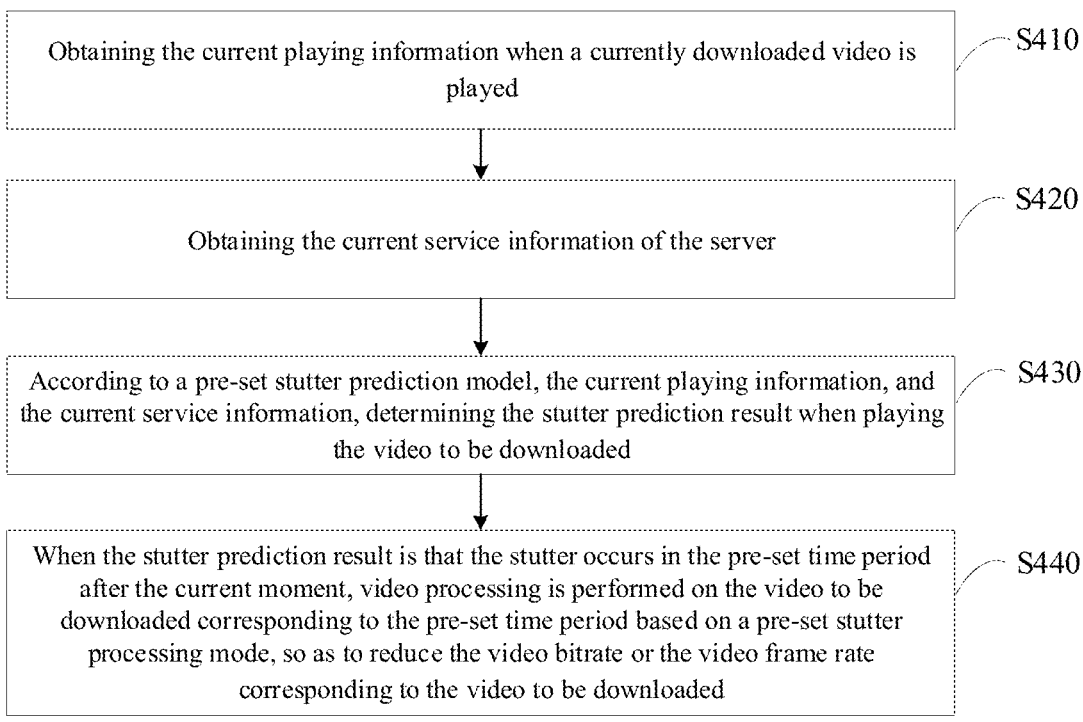

Obtaining the current playing information when a currently downloaded video is played — S410

Obtaining the current service information of the server — S420

According to a pre-set stutter prediction model, the current playing information, and the current service information, determining the stutter prediction result when playing the video to be downloaded — S430

When the stutter prediction result is that the stutter occurs in the pre-set time period after the current moment, video processing is performed on the video to be downloaded corresponding to the pre-set time period based on a pre-set stutter processing mode, so as to reduce the video bitrate or the video frame rate corresponding to the video to be downloaded — S440

Fig. 4

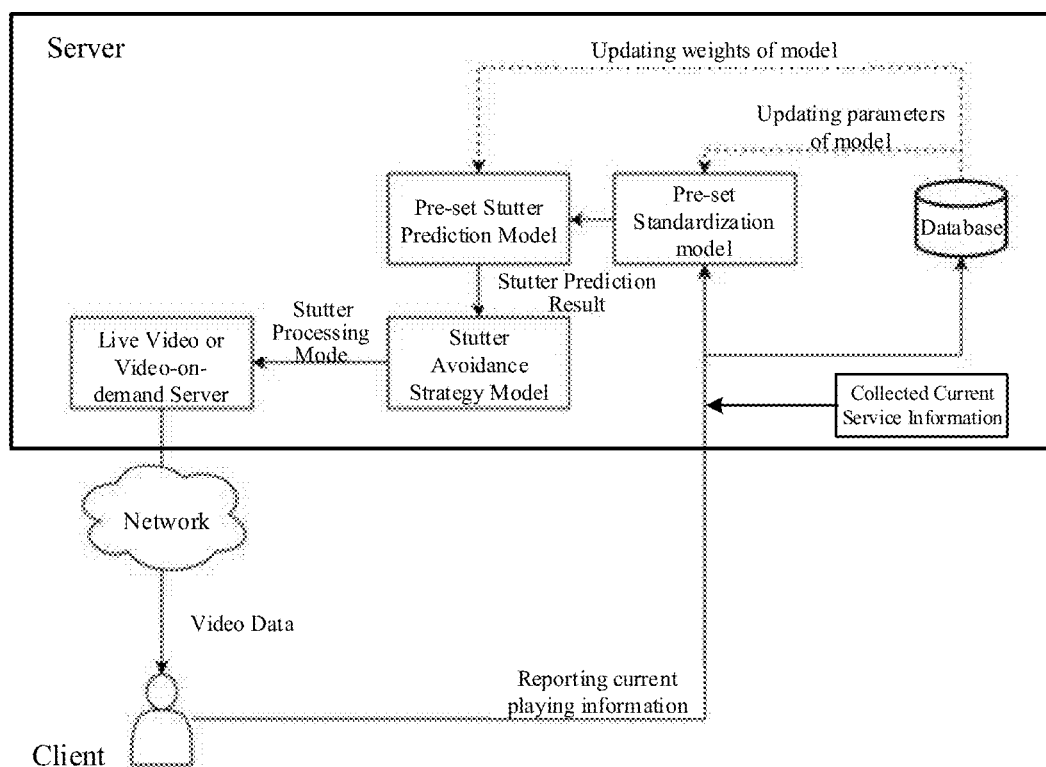

Fig. 5

VIDEO STUTTER PREDICTION METHOD AND APPARATUS, DEVICE AND MEDIUM

The present disclosure is a U.S. national stage application of International Patent Application No. PCT/CN2022/ 129721, filed on Nov. 4, 2022, which claims the priority of Chinese Patent Application No. 202111564883.5 which was filed before the Chinese Patent Office on Dec. 20, 2021, the disclosure of which is incorporated herein by reference in its entirety as part of the present application.

TECHNICAL FIELD

The present disclosure relates to the field of Internet technology, in particular, to a video stutter prediction method and apparatus, device and medium.

BACKGROUND

With the rapid development of the Internet technology, more and more users like to watch live video or video-on-demand on clients. In the process of video playing, the slow download speed of video often leads to video stutter, which seriously affects user viewing experience. At present, after a video is played, the video can be processed based on whether there is stuttering in the process of video watching, so as to improve the transmission speed and the stability of the video. It can be seen that this method can only know the stutter result of a video after the video is actually played, but can't know the stutter result of the video in advance, so it can't effectively ensure the smoothness of video playing, which lowers user viewing experience.

SUMMARY

The present disclosure provides a video stutter prediction method and apparatus, device and medium, so as to predict the video stutter of the current video to be downloaded, so that a video stutter result can be obtained in advance, thereby effectively ensuring the smoothness of video playing and improving user viewing experience.

An embodiment of the present disclosure provides a video stutter prediction method, including:

acquiring current playing information when a currently downloaded video is played;

acquiring current service information of a server; and according to a pre-set stutter prediction model, the current playing information and the current service information, determining a stutter prediction result when a video to be downloaded at present is played.

An embodiment of the present disclosure also provides a video stutter prediction apparatus, including:

a current playing information acquisition module, configured for acquiring current playing information when a currently downloaded video is played;

a current service information acquisition module, configured for acquiring current service information of a server; and a stutter prediction module, configured for, according to a pre-set stutter prediction model, the current playing information and the current service information, determining a stutter prediction result when a video to be downloaded at present is played.

An embodiment of the present disclosure also provides an electronic device, which includes:

at least one processor; and a memory for storing at least one program, wherein when the at least one program are executed by the at least one processor, the at least one processor implements the video stutter prediction method provided by any embodiment of the present disclosure.

An embodiment of the present disclosure also provides a computer-readable storage medium, on which a computer program is stored, which, when executed by a processor, implements the video stutter prediction method provided by any embodiment of the present disclosure.

BRIEF DESCRIPTION OF DRAWINGS

FIG. 4 is a flowchart of a video stutter prediction method provided in embodiment 2 of the present disclosure;

FIG. 5 is an example of a video stutter prediction process according to embodiment 2 of the present disclosure;

DETAILED DESCRIPTION

Figure 1:
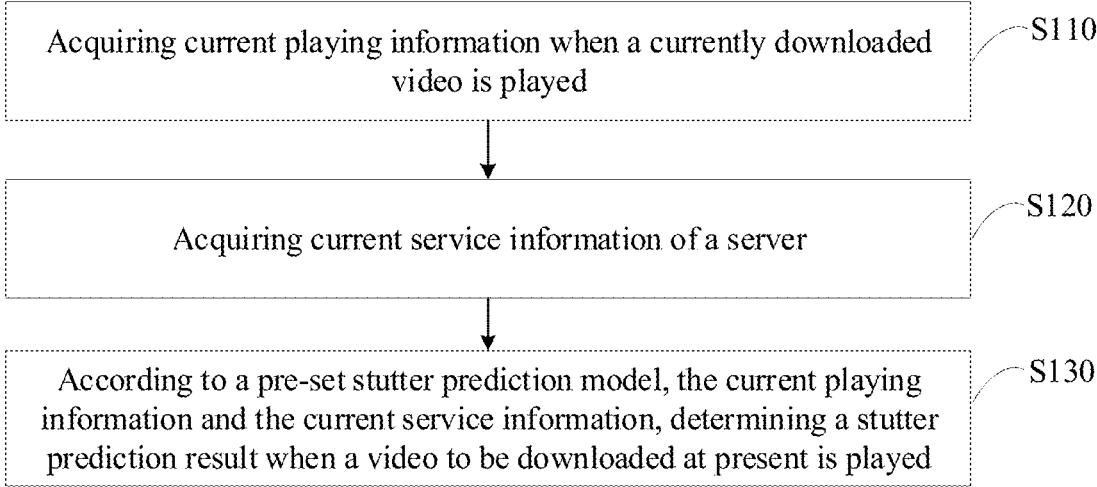
FIG. 1 is a flowchart of a video stutter prediction method provided in embodiment 1 of the present disclosure.

Embodiments of the present disclosure will be described below with reference to the accompanying drawings. Although some embodiments of the present disclosure are shown in the drawings, the present disclosure can be embodied in various forms and should not be construed as limited to the embodiments set forth herein, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, the method embodiments may include additional steps and/or omit the performing of the illustrated steps. The scope of the present disclosure is not limited in this respect.

As used herein, the term "including" or "comprising" and the variants are open-ended, that is, "including but not limited to." The term "based on" is "at least partially based on." The term "an embodiment" means "at least one embodiment"; the term "another embodiment" means "at least one other embodiment"; the term "some embodiments" means "at least some embodiments." Related definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "a/an" and "a plurality" mentioned in this disclosure are schematic rather than limiting, and those skilled in the art should understand that unless the context explicitly indicates otherwise, they should be understood as "one or more."

Names of messages or information exchanged between devices in the embodiment of the present disclosure are only used for illustrative purposes, and are not used to limit the scope of these messages or information.

Embodiment 1

FIG. 1 is a flow chart of a video stutter prediction method provided by embodiment 1 of the present disclosure. This embodiment can be applied to the situation of predicting in advance whether there is a stutter when playing the video to be downloaded currently, especially in the application scenario of predicting the stutter of live video or video-on-demand. The method can be executed by a video stutter prediction apparatus, which can be implemented by software and/or hardware and integrated in a client or a server. As shown in FIG. 1, the method specifically comprises the following steps:

S110: acquiring current playing information when a currently downloaded video is played.

The currently downloaded video may refer to the downloaded video that is currently being played by the client. In a live video scene or a video-on-demand scene, the live video or the video-on-demand can be segmented according to time to obtain video clips in the live video or the video-on-demand, so that the client can play the live video or the video-on-demand by downloading and playing each video clip in sequence. For example, the currently downloaded video may refer to a downloaded live video clip or a downloaded video-on-demand clip currently that is being played by the client.

The currently played information may include: current network information of a client, a length of currently cached video, and information of a currently downloaded video. Illustratively, the current network information may include packet loss rate, current bandwidth, maximum bandwidth, maximum network delay, minimum network delay, current round-trip delay, minimum round-trip delay, and maximum round-trip delay; the information of a currently downloaded video may include video frame rate, video bitrate, and video data size.

Specifically, when the client is playing the currently downloaded video, the current playing information corresponding to the currently downloaded video can be obtained in real time, so as to predict the video stutter in real time; it is also possible to set a corresponding time interval based on the length of currently cached video, and periodically obtain the current playing information corresponding to the currently downloaded video based on this time interval, so as to reduce the number of stutter predictions on the basis of ensuring the smoothness of video playing, thereby saving equipment resources. If this method is applied to the client, the client can directly obtain the current playing information. If the method is applied to a server, the client can send the obtained current playing information to the server, so that the server can receive the current playing information sent by the client. Through the video stutter prediction operation conducted on the server based on the current playing information sent by the client, the server resources can be fully utilized to quickly and accurately predict the video stutter of the current video to be downloaded, and the prediction accuracy and efficiency are improved.

S120: acquiring current service information of a server.

The current service information can refer to the information of the current server that can affect the video download speed. For example, the current service information may include the current load of the server, the vendor information of the content delivery network (CDN), and the information of the downloadable video amount cached by the CDN. If the vendor information of the CDN matches the user network service provider information, the video download speed can be improved, otherwise the video download speed will be lowered. The amount information of the downloadable video cached by the CDN may refer to the length of the downloadable live video clip or the length of the downloadable video-on-demand clip currently cached in the CDN node of the server.

Specifically, if the method is applied to the client, the server can send the currently collected current service information to the client, so that the client can receive the current service information sent by the server. If this method is applied to the server, the server can directly obtain the current service information, so as to make a stutter prediction based on the current service information.

S130: according to a pre-set stutter prediction model, the current playing information and the current service information, determining a stutter prediction result when a video to be downloaded at present is played.

The video to be downloaded at present may refer to the video that the client is currently waiting to download. For example, the video currently to be downloaded may refer to a live video clip or a video-on-demand clip that the client is currently waiting to download. The prediction result of stutter can include whether there is stutter or the probability of stutter in a pre-set time period after the current moment. The pre-set time period can be a time period set in advance based on a task requirement, which can include the time period from the current time to the corresponding playing time of the video to be downloaded. The prediction result of the stutter can also include the prediction duration of the stutter, that is, the length of time when the stutter is predicted to occur in a pre-set time period, so as to meet different tasks needs and scenarios. The pre-set stutter prediction model can be a neural network model that is pre-set and used to predict whether there is video stutter when the current video to be downloaded is played later. The pre-set stutter prediction model in this embodiment can be obtained by training based on sample data in advance.

The current playing information and the current service information can be input into a pre-trained pre-set stutter prediction model to predict the video stutter, and based on the output of the pre-set stutter prediction model, the stutter prediction result when the client plays the video to be downloaded at present can be obtained. The pre-set stutter prediction model can predict stutter based on the current playing information and the current service information at the same time, thus further improving the accuracy of stutter prediction.

For example, step S130 may include: preprocessing the current playing information to obtain target playing information, and preprocessing the current service information to obtain target service information; inputting the target playing information and the target service information into a pre-set stutter prediction model for stutter prediction, and obtain a stutter prediction result when a video to be downloaded at present is played.

By preprocessing the current playing information and the current service information, such as normalizing the current playing information and the current service information, filtering invalid information, etc., unified target playing information and target service information can be obtained, so as to ensure the uniformity of the information input into the pre-set stutter prediction model and further improve the accuracy of model prediction.

For example, preprocessing the current playing information to obtain the target playing information may include: conducting a data standardization processing on the current playing information based on a pre-set standardization model to obtain the target playing information. The operation of pre-processing the current service information to obtain the target service information may include: conducting a data standardization processing on the current playing information based on a pre-set standardization model to obtain the target playing information.

Figure 2:
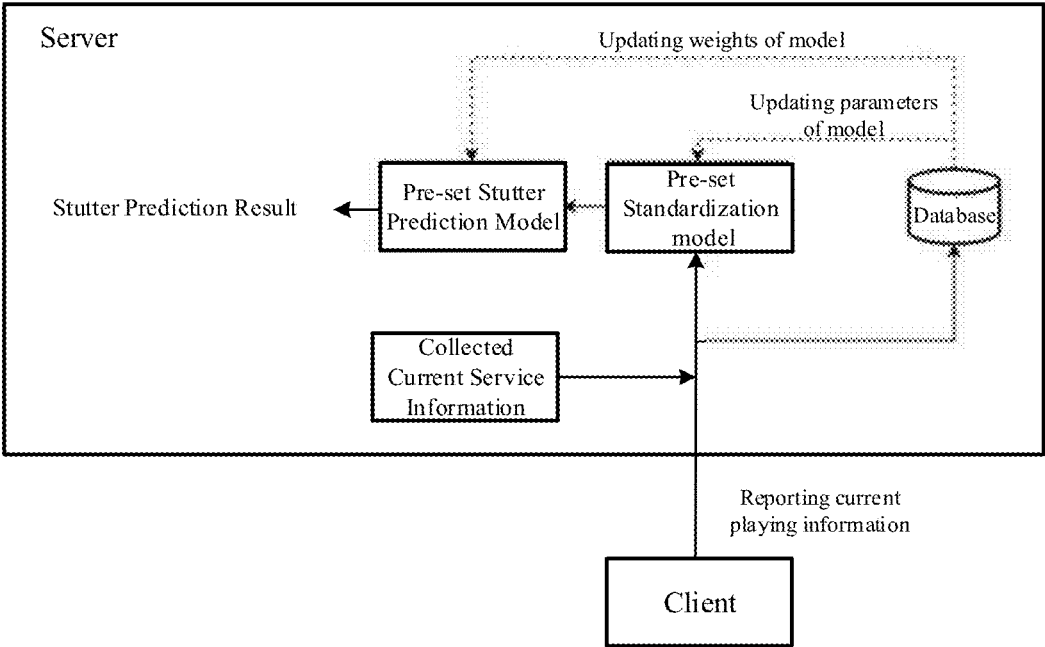
FIG. 2 is an example of a video stutter prediction process according to embodiment 1 of the present disclosure.

FIG. 2 shows an example of a video stutter prediction process. As shown in FIG. 2, the current playing information and the current service information can be quickly standardized by using a pre-set standardization model, so as to improve the processing efficiency and ensure the uniformity of input information.

The pre-set standardization model periodically updates parameters based on the playing information and the service information that are obtained in the latest pre-set time period. As shown in FIG. 2, this method is applied to the server, and the server can store the current playing information reported by the client in each operation and the current service information collected each time into a database, so that the parameters of the pre-set standardization model can be updated by using the latest stored broadcast information and service information. For example, the average and variance of each kind of information in the pre-set standardization model can be updated by using the broadcast information and service information stored in the latest day, so that the accuracy of the stutter prediction can be further improved.

For example, the embodiment can periodically collect the current playing information reported by the clients of some users (that is, users who have not conducted stutter prediction) and the current service information of the collection server, and store the current playing information and the current service information in the database. This portion of users can report whether the playing of the video to be downloaded undergoes stutter or not, that is, the actual stutter result to the server, and the server stores the actual stutter result in the database. As shown in FIG. 2, the embodiment can update the weights of the pre-set stutter prediction model based on the playing information and service information stored in the latest pre-set time period and the corresponding actual stutter result. For example, a new round of training can be conducted on the pre-set stutter prediction model by using the playing information and service information in latest one or more days and the corresponding actual stutter results, so as to further improve the accuracy of stutter prediction.

The technical scheme of the embodiment of the disclosure, by acquiring the current playing information when a currently downloaded video is played and the current service information of the server itself, and according to the pre-set stutter prediction model, the current playing information and the current service information, determines the stutter prediction result when the video to be downloaded currently is played, so that the video stutter result can be obtained in advance, thereby effectively ensuring the smoothness of video playing and improving user viewing experience.

On the basis of the above described technical scheme, the pre-set stutter prediction model can include: an output layer and at least one residual network (ResNet); each residual network (ResNet) includes a first fully connected layer, a first activation layer, a second fully connected layer, and a second activation layer; the output of the first fully connected layer is used as the input of the first activation layer;

the output of the first activation layer is used as the input of the second fully connected layer, and the output of the second fully connected layer is in jump connection with the input of the first fully connected layer, and the addition result after the jump connection is used as the input of the second active layer.

The activation functions used by the first activation layer and the second activation layer may be Rectified Linear Unit (ReLU) activation functions. The activation function used by the output layer may be sigmoid function. The information output by the output layer can be the probability of stutter occurring. When the probability is less than 0.5, it means that a stutter will not occur, and when the probability is greater than 0.5, it means that a stutter will occur.

Figure 3:
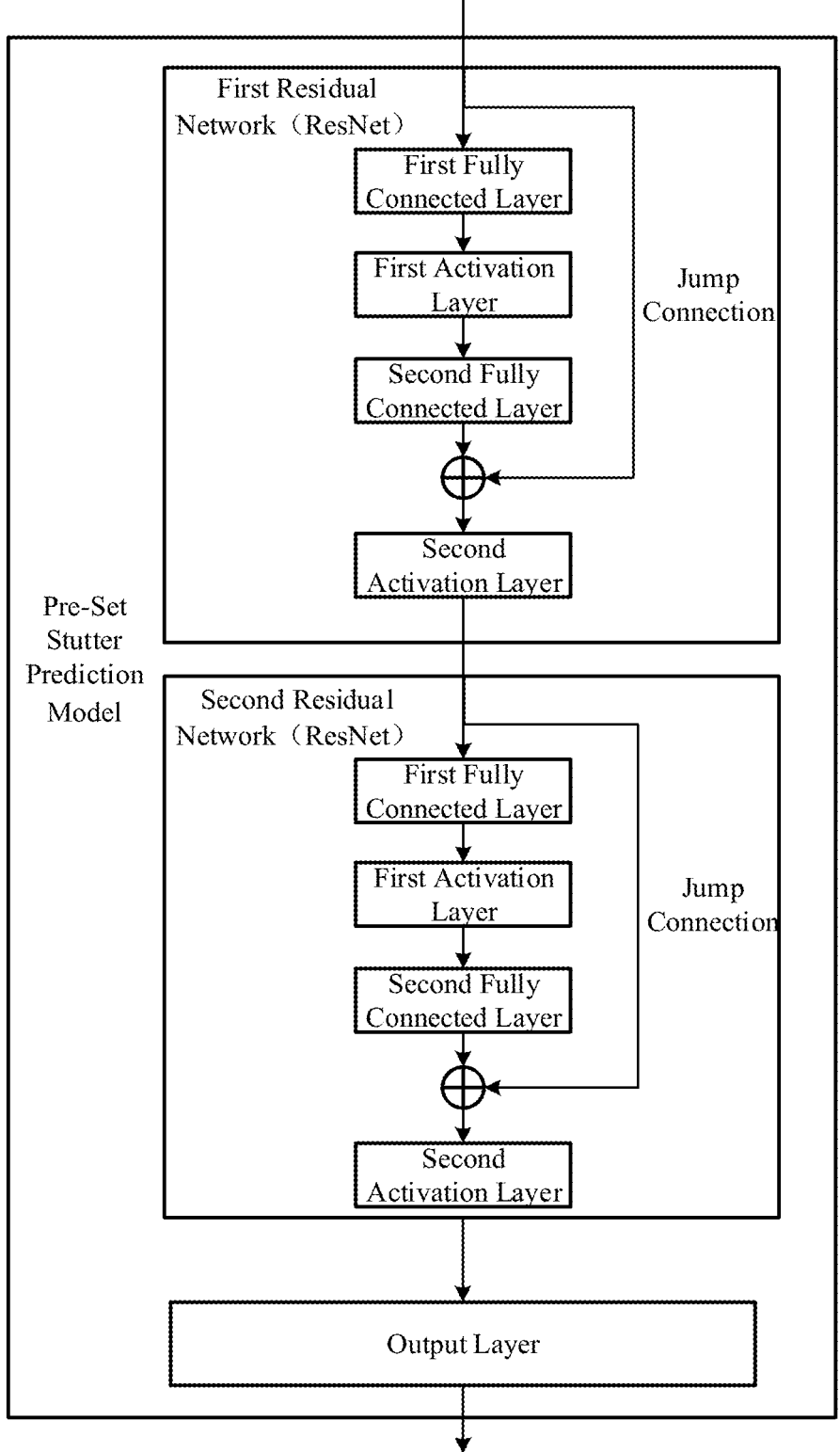
FIG. 3 is a structural example of a pre-set stutter prediction model according to embodiment 1 of the present disclosure.

FIG. 3 shows a structural example of a pre-set stutter prediction model. As shown in FIG. 3, the accuracy of the stutter prediction is the highest when the pre-set stutter prediction model includes two residual networks (ResNet), so the pre-set stutter prediction model composed of two residual networks (ResNet) can be selected. For example, the prediction process of the pre-set stutter prediction model in FIG. 3 is as follows: inputting the target playing information and the target service information to the first fully connected layer in the first residual network (ResNet) to obtain the first fully connected information; inputting the first fully connected information to the first activation layer to obtain the first activated information; inputting the first activated information to the second fully connected layer to obtain the second fully connected information; and adding the second fully connected information with the target playing information and the target service information that are inputted. Similarly, the second activation information output by the first residual network (ResNet) is input into the second residual network (ResNet) for similar processing to obtain the information output by the second residual network (ResNet), and the information is input into the output layer for mapping processing, so as to obtain the final output stutter prediction result.

Embodiment 2

FIG. 4 is a flow chart of a video stutter prediction method provided by embodiment 2 of the present disclosure. Based on embodiment 1 that is above described, this embodiment describes the video processing process of the video to be downloaded that is predicted to undergo stutter. The explanations of terms that are the same as or corresponding to the above-mentioned embodiments are not repeated here.

Referring to FIG. 4, the video stutter prediction method provided by this embodiment specifically includes the following steps:

S410: obtaining the current playing information when a currently downloaded video is played.

S420: obtaining the current service information of the server.

S430: according to a pre-set stutter prediction model, the current playing information, and the current service information, determining the stutter prediction result when playing the video to be downloaded.

S440: when the stutter prediction result is that the stutter occurs in the pre-set time period after the current moment, video processing is performed on the video to be downloaded corresponding to the pre-set time period based on a pre-set stutter processing mode, so as to reduce the video bitrate or the video frame rate corresponding to the video to be downloaded.

The pre-set stutter processing mode can be a pre-set mode for reducing the amount of video data transmitted between the server and the client, so as to avoid unnecessary video stuttering and ensure the smoothness of video playing. The pre-set stutter processing mode may be implemented in various modes. For example, the pre-set stutter processing mode can refer to a mode of reducing video bitrate or a mode of reducing video frame rate.

FIG. 5 shows an example of a video stutter prediction process. As shown in FIG. 5, the stutter avoidance strategy model in the server can make a corresponding decision based on the stutter prediction result output by the pre-set stutter prediction model. For example, if the stutter prediction result shows a stutter occurs in a pre-set time period after the current moment, a stutter processing mode of reducing transmission video bitrate or reducing transmission video frame rate can be determined, so that the live video or video-on-demand server performs video processing on the video to be downloaded in the pre-set time period based on the stutter processing mode, thereby reducing the amount of video data transmitted between the server and the client, avoiding unnecessary video stutter, ensuring the smoothness of video playing and improving the user experience.

For example, the process of processing the video to be downloaded that is predicted to undergo stutter can be implemented in the following three ways:

As a first implementation, "processing the video to be downloaded corresponding to the pre-set time period based on the pre-set stutter processing mode" in S440 may include: based on a first video bitrate corresponding to the currently downloaded video, determining a second video bitrate that is smaller than the first video bitrate; based on the pre-stored videos to be downloaded corresponding to the pre-set time period at each video bitrate, determining the target videos to be downloaded corresponding to the pre-set time period at the second video bitrate.

In the video-on-demand scene, videos to be downloaded with different video bitrates can be generated and stored in advance for each video clip in the process of video-on-demand. When the video to be downloaded is processed in view of stutter, a video bitrate smaller than the first video bitrate in the currently download can be selected as the second video bitrate, and the target video to be downloaded at the second video bitrate can be quickly obtained from the pre-stored videos to enable the client to download the target video to be downloaded, thereby improving the stutter processing efficiency, and reducing the amount of downloaded video data by reducing the video bitrate, so that the target video to be downloaded can be downloaded more quickly, thus avoiding the situation where a stutter occurs when the video is subsequently played.

As a second implementation, "processing the video to be downloaded corresponding to the pre-set time period based on the pre-set stutter processing mode" in S440 may include: conducting a video frame extracting of the video to be downloaded corresponding to the pre-set time period to obtain an extracted target video to be downloaded.

In a live broadcast scene or a video-on-demand scene, the video frame extraction method can be used for each video to be downloaded corresponding to a pre-set time period, so as to reduce the video frame rate of the target video to be downloaded, thereby reducing the amount of downloaded video data and avoiding the occurring of subsequent video stutter.

As a third implementation, "processing the video to be downloaded corresponding to the pre-set time period based on the pre-set stutter processing mode" in S440 may include transcoding the video to be downloaded corresponding to the pre-set time period based on a target video coding mode to obtain a processed target video to be downloaded; the video bitrate of the target video coding mode is smaller than that of the current video coding mode; or, the video frame rate of the target video coding mode is less than that of the current video coding mode.

In the live broadcast scene, it is possible to transcode the video clips obtained in real time to ensure the video fluency. In this embodiment, the video to be downloaded can be transcoded by using the target video coding mode with a low video bitrate and/or a low video frame rate, so as to reduce the video bitrate and/or the video frame rate of the processed target video to be downloaded, further reduce the amount of transmitted video data, and avoid the occurring of subsequent video stutter.

According to the technical scheme of this embodiment, when the stutter prediction result is that a stutter occurs in a pre-set time period after the current moment, the video to be downloaded corresponding to the pre-set time period can be processed based on the pre-set stutter processing mode, and the amount of video data transmitted between the server and the client is reduced by reducing the video bitrate or the video frame rate corresponding to the video to be downloaded, thus avoiding unnecessary video stutter, ensuring the smoothness of video playing, and improving user viewing experience.

On the basis of the above technical scheme, the stutter prediction result also includes a stutter prediction duration when stutter occurring in the pre-set time period after the current moment. Accordingly, "processing the video to be downloaded corresponding to the pre-set time period based on the pre-set stutter processing mode" in step S440 may include conducting a video processing on a video to be downloaded corresponding to the stutter prediction duration based on the pre-set stutter processing mode.

The stutter processing process of the video to be downloaded corresponding to the stutter prediction duration can be referred to the above three implementations, and will not be repeated here.

The stutter prediction result can further predict the corresponding stutter prediction duration when it predict that a stutter will occur, so that only the video to be downloaded that is necessary to be downloaded within the stutter prediction duration needs to be processed, that is, the video bitrate or the video frame rate of the video to be downloaded corresponding to the stutter prediction duration is reduced, and other videos to be downloaded do not need to be processed, so that the video viewing quality can be further guaranteed and the user experience can be improved.

The following is an embodiment of the video stutter prediction apparatus provided by the embodiment of this disclosure, which is from the same inventive concept as the video stutter prediction method of the above embodiment. The details that are not described in detail in the embodiment of the video stutter prediction apparatus can be referred to the above embodiment.

Embodiment 3

Figure 6:
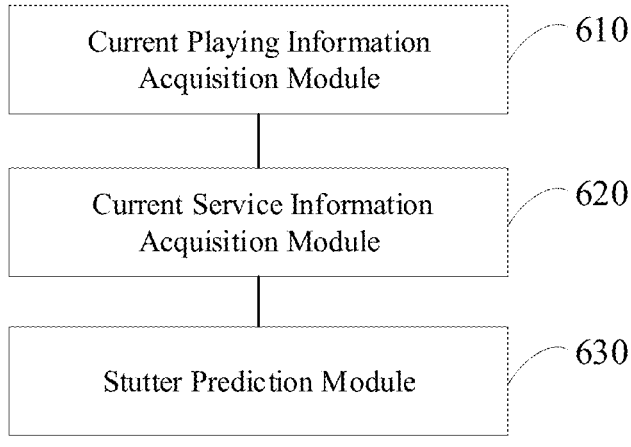
FIG. 6 is a schematic structural diagram of a video stutter prediction apparatus provided in embodiment 3 of the present disclosure.

FIG. 6 is a schematic structural diagram of a video stutter prediction apparatus provided by embodiment 3 of the present disclosure. This embodiment can be applied to the situation of predicting in advance whether there is a stutter when a video to be downloaded at present is played, especially in the application scenario of predicting the stutter of live video or video-on-demand. As shown in FIG. 6, the device specifically includes a current playing information acquisition module 610, a current service information acquisition module 620, and a stutter prediction module 630.

The current playing information acquisition module 610 is configured to acquire current playing information when a currently downloaded video is played; the current service information acquisition module 620 is configured to acquire current service information of a server; the stutter prediction module 630, configured to, according to a pre-set stutter prediction model, the current playing information and the current service information, determine a stutter prediction result when a video to be downloaded at present is played.

According to the technical scheme of the embodiment of the disclosure, by acquiring the current playing information when a currently downloaded video is played and the current service information of the server itself, and according to the pre-set stutter prediction model, the current playing information, and the current service information, the stutter prediction result when a video to be downloaded at present is played can be determined, so that the video stutter result can be obtained in advance, thereby effectively ensuring the smoothness of video playing and improving user viewing experience.

On the basis of the above technical scheme, the current service information includes: the current load of the server, the vendor information of content delivery network (CDN), and the information of downloadable video amount cached by the CDN.

On the basis of the above technical schemes, the pre-set stutter prediction model includes: an output layer and at least one residual network (ResNet); each residual network (ResNet) includes a first fully connected layer, a first activation layer, a second fully connected layer, and a second activation layer;

The output of the first fully connected layer is used as the input of the first activation layer; the output of the first activation layer is used as the input of the second fully connected layer, and the output of the second fully connected layer is in jump connection with the input of the first fully connected layer, and the addition result after the jump connection is used as the input of the second active layer.

On the basis of the above technical solutions, the stutter prediction module 630 may include:

a preprocessing unit that is configured for preprocessing the current playing information to obtain the target playing information and preprocessing the current service information to obtain the target service information; and a stutter prediction unit that is used for inputting the target playing information and the target service information into a pre-set stutter prediction model for stutter prediction, and obtaining a stutter prediction result when a video to be downloaded at present is played.

On the basis of the above technical schemes, the preprocessing unit is further configured for: conducting a data standardization processing on the current playing information based on a pre-set standardization model to obtain the target playing information; the pre-set standardization model periodically updates parameters based on the playing information obtained in the latest pre-set time.

On the basis of the above technical schemes, the device also comprises:

a stutter processing module, configured for performing video processing on the video to be downloaded corresponding to the pre-set time period based on the pre-set stutter processing mode if the stutter prediction result is that there occurs stutter in the pre-set time period after the current moment, so as to reduce the video bitrate or the video frame rate corresponding to the video to be downloaded.

On the basis of the above technical schemes, the stutter processing module is specifically configured for:

based on a first video bitrate corresponding to the currently downloaded video, determining a second video bitrate smaller than the first video bitrate; based on the pre-stored videos to be downloaded corresponding to the pre-set time period at each video bitrate, determining the target videos to be downloaded corresponding to the pre-set time period at the second video bitrate.

On the basis of the above technical schemes, the stutter processing module is also specifically configured for:

conducting a video frame extracting of the video to be downloaded corresponding to the pre-set time period to obtain an extracted target video to be downloaded.

On the basis of the above technical schemes, the stutter processing module is also specifically configured for:

transcoding the video to be downloaded corresponding to the pre-set time period based on a target video coding mode to obtain a processed target video to be downloaded, wherein a video bitrate of the target video coding mode is smaller than a video bitrate of a current video coding mode; or, a video frame rate of the target video coding mode is smaller than a video frame rate of the current video coding mode.

On the basis of the above technical schemes, the stutter prediction result further includes: a stutter prediction duration when stutter occurring in the pre-set time period after the current moment;

the stutter processing module is specifically configured for conducting a video processing on the video to be downloaded corresponding to the stutter prediction duration based on the pre-set stutter processing mode.

On the basis of the above technical schemes, the current playing information includes the current network information of the client, the length of currently cached video, and the information of the currently downloaded video.

On the basis of the above technical schemes, the current network information includes packet loss rate, current bandwidth, maximum bandwidth, maximum network delay, minimum network delay, current round-trip delay, minimum round-trip delay, and maximum round-trip delay;

the information of the currently downloaded video comprises video frame rate, video bitrate, and video data size.

The video stutter prediction apparatus provided by the embodiment of the present disclosure can execute the video stutter prediction method provided by any embodiment of the present disclosure, and has the corresponding functional module(s) and beneficial effects for executing the video stutter prediction method.

It should be noted that in the above embodiment of the video stutter prediction apparatus, the units and modules included are only divided according to the functional logic, but not limited to the above division, as long as the corresponding functions can be implemented; in addition, the specific names of functional units are only for convenience of distinguishing each other and are not used to limit the protection scope of the present disclosure.

Embodiment 4

Figure 7:
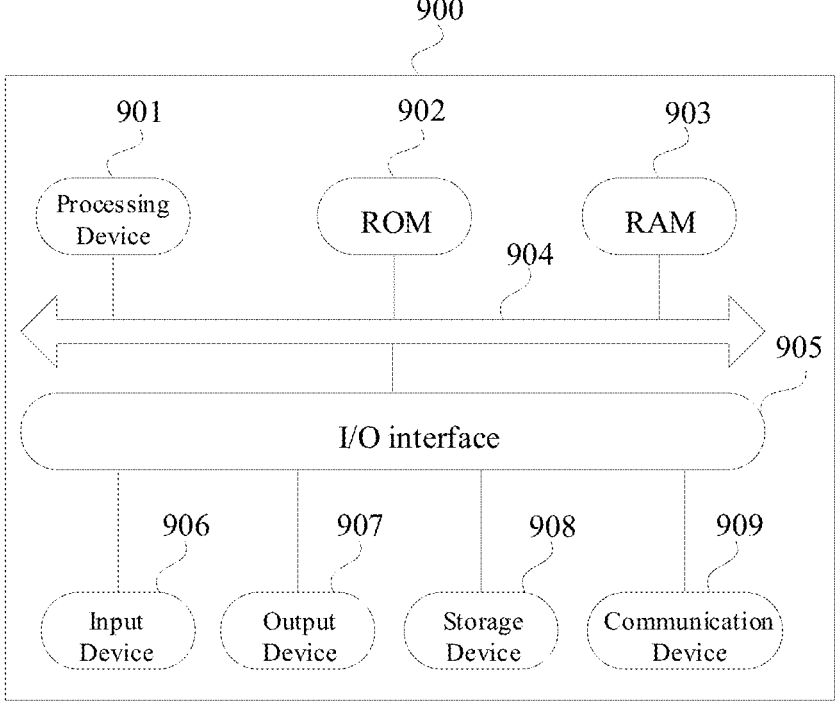
FIG. 7 is a schematic structural diagram of an electronic device provided in Embodiment 4 of the present disclosure.

Reference is now made to FIG. 7, which shows a structural schematic diagram of an electronic device 900 suitable for implementing an embodiment of the present disclosure.

The electronic device shown in FIG. 7 is only an example, and should not implementing any limitation upon the function and application scope of the embodiment of the present disclosure.

As shown in FIG. 7, an electronic device 900 may include a processing device (such as a central processing unit, a graphics processor, etc.) 901, the processing device 901 may perform various appropriate actions and processes according to a program stored in a read-only memory (ROM) 902 or a program loaded from a storage device 908 into a random access memory (RAM) 903. In the RAM 903, various programs and data required for the operation of the electronic device 900 are also stored. The processing device 901, the ROM 902 and the RAM 903 are connected to each other through a bus 904. An input/output (I/O) interface 905 is also connected to the bus 904.

Generally, the following devices can be connected to the I/O interface 905: an input device 906 including, for example, a touch screen, a touch pad, a keyboard, a mouse, a camera, a microphone, an accelerometer, a gyroscope, etc.; An output device 907 including, for example, a liquid crystal display (LCD), a speaker, a vibrator, etc. Includes a storage device 908 such as a magnetic tape, a hard disk, etc. And a communication device 909. The communication device 909 may allow the electronic device 900 to communicate wirelessly or wired with other devices to exchange data. Although FIG. 7 shows an electronic device 900 with various devices, it should be understood that it is not required to implement or have all the devices shown. More or fewer devices may alternatively be implemented or provided.

In particular, according to an embodiment of the present disclosure, the process described above with reference to the flowchart can be implemented as a computer software program. For example, an embodiment of the present disclosure includes a computer program product including a computer program carried on a non-transitory computer-readable medium, which contains program code for executing the method shown in the flowchart. In such an embodiment, the computer program can be downloaded and installed from the network through the communication device 909, or installed from the storage device 908, or installed from the ROM 902. When the computer program is executed by the processing device 901, the above functions defined in the method of the embodiment of the present disclosure are performed.

The electronic equipment provided by an embodiment of the present disclosure belongs to the same inventive concept as the video stutter prediction method provided by the above embodiments, and the technical details not described in detail in the embodiment of the present disclosure can be referred to the above embodiment, and the embodiment of the present disclosure has the same beneficial effects as the above embodiment.

Embodiment 5

An embodiment of the present disclosure provides a computer storage medium, on which a computer program is stored, which, when executed by a processor, implements the video stutter prediction method provided in any above embodiment.

It should be noted that the computer-readable medium recited above in this disclosure can be a computer-readable signal medium or a computer-readable storage medium or any combination of the two. The computer-readable storage medium can be, for example, but not limited to, an electrical, magnetic, optical, electromagnetic, infrared, or semiconductor system, device or device, or a combination of any of the above. More specific examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In this disclosure, a computer-readable storage medium can be any tangible medium containing or storing a program, which can be used by or in combination with an instruction execution system, apparatus or device. In this disclosure, a computer-readable signal medium may include a data signal propagated in baseband or as part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer-readable medium can be transmitted by any suitable medium, including but not limited to: wires, optical cables, RF (radio frequency) and the like, or any suitable combination of the above.

In some embodiments, the client and the server can communicate by using any currently known or future developed network protocol such as HTTP (HyperText Transfer Protocol), and can be interconnected with digital data communication in any form or medium (for example, communication network). Examples of communication networks include a local area network ("LAN"), a wide area network ("WAN"), the Internet (for example, the Internet) and end-to-end networks (for example, ad hoc end-to-end networks), as well as any currently known or future developed networks.

The computer-readable medium may be included in the server; it can also exist alone without being assembled into the server.

The computer-readable medium carries at least one program, which, when executed by the server, cause the server to: acquiring current playing information when a currently downloaded video is played; acquiring current service information of a server; and according to a pre-set stutter prediction model, the current playing information and the current service information, determining a stutter prediction result when a video to be downloaded at present is played.

Computer program codes for performing the operations of the present disclosure may be written in one or more programming languages or their combinations, including but not limited to object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program clip, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiment described in the present disclosure can be implemented by software or hardware. The name of a unit does not constitute the limitation of the unit itself in some cases. For example, the editable content display unit can also be described as an "editing unit".

The functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of this disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, device or equipment, or any suitable combination of the above. More specific examples of the machine-readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

According to one or more embodiments of the present disclosure, [Example 1] provides a video stutter prediction method, including:

acquiring current playing information when a currently downloaded video is played;

acquiring current service information of a server; and according to a pre-set stutter prediction model, the current playing information and the current service information, determining a stutter prediction result when a video to be downloaded at present is played.

According to one or more embodiments of the present disclosure, [Example 2] provides a video stutter prediction method, which is applied to a server and further includes:

Optionally, the current service information includes a current load of the server, vendor information of a content delivery network (CDN), and information of downloadable video amount cached by the CDN.

According to one or more embodiments of the present disclosure, [Example 3] provides a video stutter prediction method, which is applied to a server and further includes:

optionally, the pre-set stutter prediction model includes an output layer and at least one residual network (ResNet); and each residual network (ResNet) includes a first fully connected layer, a first activation layer, a second fully connected layer, and a second activation layer, wherein an output of the first fully connected layer serves as an input of the first activation layer; an output of the first activation layer is used as an input of the second fully connected layer, and an output of the second fully connected layer is in a jump connection with an input of the first fully connected layer, and an addition result after the jump connection is used as an input of the second active layer.

According to one or more embodiments of the present disclosure, [Example 4] provides a video stutter prediction method, which is applied to a server and further includes:

optionally, according to the pre-set stutter prediction model, the current playing information, and the current service information, determining the stutter prediction result of the video to be downloaded at present includes:

preprocessing the current playing information to obtain target playing information, and preprocessing the current service information to obtain target service information; and inputting the target playing information and the target service information into the pre-set stutter prediction model for stutter prediction, and obtaining the stutter prediction result when the video to be downloaded at present is played.

According to one or more embodiments of the present disclosure, [Example 5] provides a video stutter prediction method, which is applied to a server and further includes:

optionally, the preprocessing of the current playing information to obtain the target playing information includes:

conducting a data standardization processing on the current playing information based on a pre-set standardization model to obtain the target playing information;

wherein the pre-set standardization model periodically updates parameters based on the playing information acquired in an updated pre-set time period.

According to one or more embodiments of the present disclosure, [Example 6] provides a video stutter prediction method, which is applied to a server and further includes:

optionally, the method further includes:

when the stutter prediction result is that a stutter occurs in a pre-set time period after a current moment, conducting a video processing on a video to be downloaded in the pre-set time period based on a pre-set stutter processing mode, so as to reduce a video bitrate or a video frame rate corresponding to the video to be downloaded.

According to one or more embodiments of the present disclosure, [Example 7] provides a video stutter prediction method, which is applied to a server and further includes:

optionally, the conducting a video processing on a video to be downloaded in the pre-set time period based on a pre-set stutter processing mode includes:

based on a first video bitrate corresponding to a currently downloaded video, determining a second video bitrate which is smaller than the first video bitrate; and based on pre-stored video to be downloaded corresponding to the pre-set time period at video rates, determining a target video to be downloaded corresponding to the pre-set time period at the second video rate.

According to one or more embodiments of the present disclosure, [Example 8] provides a video stutter prediction method, which is applied to a server and further includes:

optionally, the conducting a video processing on a video to be downloaded in the pre-set time period based on a pre-set stutter processing mode includes:

conducting a video frame extracting of the video to be downloaded corresponding to the pre-set time period to obtain an extracted target video to be downloaded.

According to one or more embodiments of the present disclosure, [Example 9] provides a video stutter prediction method, which is applied to a server and further includes:

optionally, the conducting a video processing on a video to be downloaded in the pre-set time period based on a pre-set stutter processing mode includes:

transcoding the video to be downloaded corresponding to the pre-set time period based on a target video coding mode to obtain a processed target video to be downloaded, wherein a video bitrate of the target video coding mode is smaller than a video bitrate of a current video coding mode; or, a video frame rate of the target video coding mode is smaller than a video frame rate of the current video coding mode.

According to one or more embodiments of the present disclosure, [Example 10] provides a video stutter prediction method, which is applied to a server and further includes:

optionally, the stutter prediction result further includes a stutter prediction duration when stutter occurring in the pre-set time period after the current moment;

the conducting a video processing on a video to be downloaded in the pre-set time period based on a pre-set stutter processing mode includes:

conducting a video processing on a video to be downloaded corresponding to the stutter prediction duration based on the pre-set stutter processing mode.

According to one or more embodiments of the present disclosure, [Example 11] provides a video stutter prediction method, further including:

optionally, the current playing information includes current network information of a client, a length of currently cached video, and information of a currently downloaded video.

According to one or more embodiments of the present disclosure, [Example 12] provides a video stutter prediction method, further including:

optionally, the current network information of the client includes packet loss rate, current bandwidth, maximum bandwidth, maximum network delay, minimum network delay, current round-trip delay, minimum round-trip delay and maximum round-trip delay; and the information of the currently downloaded video includes video frame rate, video bitrate, and video data size.

According to one or more embodiments of the present disclosure, [Example 13] provides a video stutter prediction apparatus, including:

a current playing information acquisition module, configured for acquiring current playing information when a currently downloaded video is played;

a current service information acquisition module, configured for acquiring current service information of a server; and a stutter prediction module, configured for, according to a pre-set stutter prediction model, the current playing information and the current service information, determining a stutter prediction result when a video to be downloaded at present is played.

The above description is only the preferred embodiment of the present disclosure and the explanation of the applied technical principles. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in this disclosure.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

The invention claimed is:

1. A video stutter prediction method, comprising:

acquiring current playing information when a currently downloaded video is played;

acquiring current service information of a server;

according to a pre-set stutter prediction model, the current playing information and the current service information, determining a stutter prediction result when a video to be downloaded at present is played; and in response to the stutter prediction result being that a stutter occurs in a pre-set time period after a current moment, conducting a video processing on a video to be downloaded in the pre-set time period based on a pre-set stutter processing mode to reduce a video bitrate or a video frame rate corresponding to the video to be downloaded.

2. The method according to claim 1, wherein the current service information includes a current load of the server, vendor information of a content delivery network (CDN), and information of downloadable video amount cached by the CDN.

3. The method according to claim 1, wherein the pre-set stutter prediction model comprises an output layer and at least one residual network (ResNet); and each residual network (ResNet) comprises a first fully connected layer, a first activation layer, a second fully connected layer, and a second activation layer, wherein an output of the first fully connected layer serves as an input of the first activation layer; an output of the first activation layer is used as an input of the second fully connected layer, and an output of the second fully connected layer is in a jump connection with an input of the first fully connected layer, and an addition result after the jump connection is used as an input of the second active layer.

4. The method according to claim 1, wherein, according to the pre-set stutter prediction model, the current playing information, and the current service information, determining the stutter prediction result of the video to be downloaded at present comprises:

preprocessing the current playing information to obtain target playing information, and preprocessing the current service information to obtain target service information; and inputting the target playing information and the target service information into the pre-set stutter prediction model for stutter prediction, and obtaining the stutter prediction result when the video to be downloaded at present is played.

5. The method according to claim 4, wherein the preprocessing of the current playing information to obtain the target playing information comprises:

conducting a data standardization processing on the current playing information based on a pre-set standardization model to obtain the target playing information, wherein the pre-set standardization model periodically updates parameters based on the playing information acquired in an updated pre-set time period.

6. The method according to claim 1, wherein the conducting a video processing on a video to be downloaded in the pre-set time period based on a pre-set stutter processing mode comprises:

based on a first video bitrate corresponding to a currently downloaded video, determining a second video bitrate which is smaller than the first video bitrate; and based on pre-stored video to be downloaded corresponding to the pre-set time period at video bitrates, determining a target video to be downloaded corresponding to the pre-set time period at the second video bitrate.

7. The method according to claim 1, wherein the conducting a video processing on a video to be downloaded in the pre-set time period based on a pre-set stutter processing mode comprises:

conducting a video frame extracting of the video to be downloaded corresponding to the pre-set time period to obtain an extracted target video to be downloaded.

8. The method according to claim 1, wherein the conducting a video processing on a video to be downloaded in the pre-set time period based on a pre-set stutter processing mode comprises:

transcoding the video to be downloaded corresponding to the pre-set time period based on a target video coding mode to obtain a processed target video to be downloaded, wherein a video bitrate of the target video coding mode is smaller than a video bitrate of a current video coding mode; or, a video frame rate of the target video coding mode is smaller than a video frame rate of the current video coding mode.

9. The method according to claim 1, wherein the stutter prediction result further comprises a stutter prediction duration when stutter occurring in the pre-set time period after the current moment;

the conducting a video processing on a video to be downloaded in the pre-set time period based on a pre-set stutter processing mode comprises:

conducting a video processing on a video to be downloaded corresponding to the stutter prediction duration based on the pre-set stutter processing mode.

10. The method according to claim 1, wherein the current playing information comprises current network information of a client, a length of currently cached video, and information of a currently downloaded video.

11. The method according to claim 10, wherein the current network information of the client comprises packet loss rate, current bandwidth, maximum bandwidth, maximum network delay, minimum network delay, current round-trip delay, minimum round-trip delay and maximum round-trip delay; and the information of the currently downloaded video comprises video frame rate, video bitrate, and video data size.

12. An electronic device comprising:

at least one processor; and a memory for storing at least one program, wherein the at least one program, when executed by the at least one processor, causes the at least one processor to implement operations, and the operations comprise:

acquiring current playing information when a currently downloaded video is played;

acquiring current service information of a server;

according to a pre-set stutter prediction model, the current playing information and the current service information, determining a stutter prediction result when a video to be downloaded at present is played; and in response to the stutter prediction result being that a stutter occurs in a pre-set time period after a current moment, conducting a video processing on a video to be downloaded in the pre-set time period based on a pre-set stutter processing mode to reduce a video bitrate or a video frame rate corresponding to the video to be downloaded.

13. The electronic device according to claim 12, wherein the current service information includes a current load of the server, vendor information of a content delivery network (CDN), and information of downloadable video amount cached by the CDN.

14. The electronic device according to claim 12, wherein the pre-set stutter prediction model comprises an output layer and at least one residual network (ResNet); and each residual network (ResNet) comprises a first fully connected layer, a first activation layer, a second fully connected layer, and a second activation layer, wherein an output of the first fully connected layer serves as an input of the first activation layer; an output of the first activation layer is used as an input of the second fully connected layer, and an output of the second fully connected layer is in a jump connection with an input of the first fully connected layer, and an addition result after the jump connection is used as an input of the second active layer.

15. The electronic device according to claim 12, wherein, according to the pre-set stutter prediction model, the current playing information, and the current service information, determining the stutter prediction result of the video to be downloaded at present comprises:

preprocessing the current playing information to obtain target playing information, and preprocessing the current service information to obtain target service information; and inputting the target playing information and the target service information into the pre-set stutter prediction model for stutter prediction, and obtaining the stutter prediction result when the video to be downloaded at present is played.

16. The electronic device according to claim 15, wherein the preprocessing of the current playing information to obtain the target playing information comprises:

conducting a data standardization processing on the current playing information based on a pre-set standardization model to obtain the target playing information, wherein the pre-set standardization model periodically updates parameters based on the playing information acquired in an updated pre-set time period.

17. A non-transitory computer-readable storage medium on which a computer program is stored, wherein the program, when executed by a processor, causes the processor to implement operations, and the operations comprise:

acquiring current playing information when a currently downloaded video is played;

acquiring current service information of a server;

according to a pre-set stutter prediction model, the current playing information and the current service information, determining a stutter prediction result when a video to be downloaded at present is played; and in response to the stutter prediction result being that a stutter occurs in a pre-set time period after a current moment, conducting a video processing on a video to be downloaded in the pre-set time period based on a pre-set stutter processing mode to reduce a video bitrate or a video frame rate corresponding to the video to be downloaded.

18. The non-transitory computer-readable storage medium according to claim 17, wherein the current service information includes a current load of the server, vendor information of a content delivery network (CDN), and information of downloadable video amount cached by the CDN.

19. The non-transitory computer-readable storage medium according to claim 17, wherein the pre-set stutter prediction model comprises an output layer and at least one residual network (ResNet); and each residual network (ResNet) comprises a first fully connected layer, a first activation layer, a second fully connected layer, and a second activation layer, wherein an output of the first fully connected layer serves as an input of the first activation layer; an output of the first activation layer is used as an input of the second fully connected layer, and an output of the second fully connected layer is in a jump connection with an input of the first fully connected layer, and an addition result after the jump connection is used as an input of the second active layer.

20. The non-transitory computer-readable storage medium according to claim 17, wherein the determining the stutter prediction result comprises:

preprocessing the current playing information to obtain target playing information, and preprocessing the current service information to obtain target service information; and inputting the target playing information and the target service information into the pre-set stutter prediction model for stutter prediction, and obtaining the stutter prediction result when the video to be downloaded at present is played.

* * * * *